Oct. 22, 1963    K. A. DÜPPENGIESSER    3,107,937
HAND GRIP FOR SOIL-WORKING IMPLEMENTS
Filed March 1, 1960    3 Sheets-Sheet 1
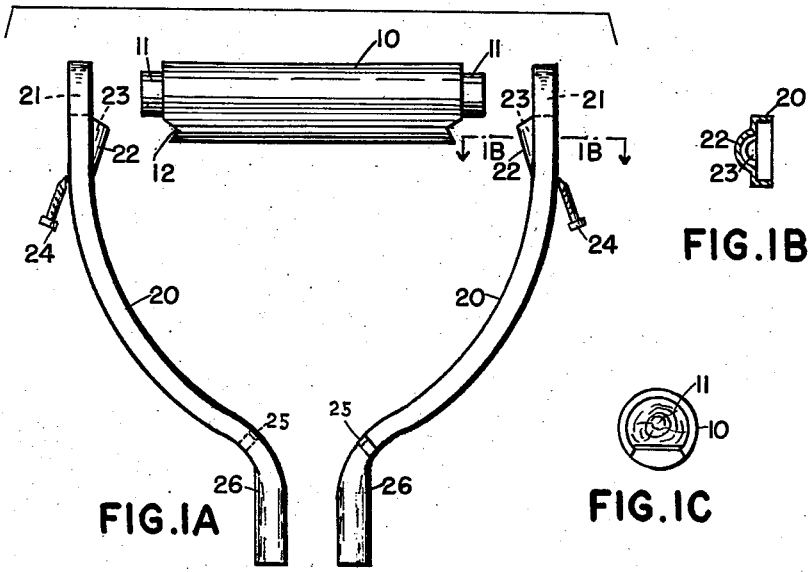
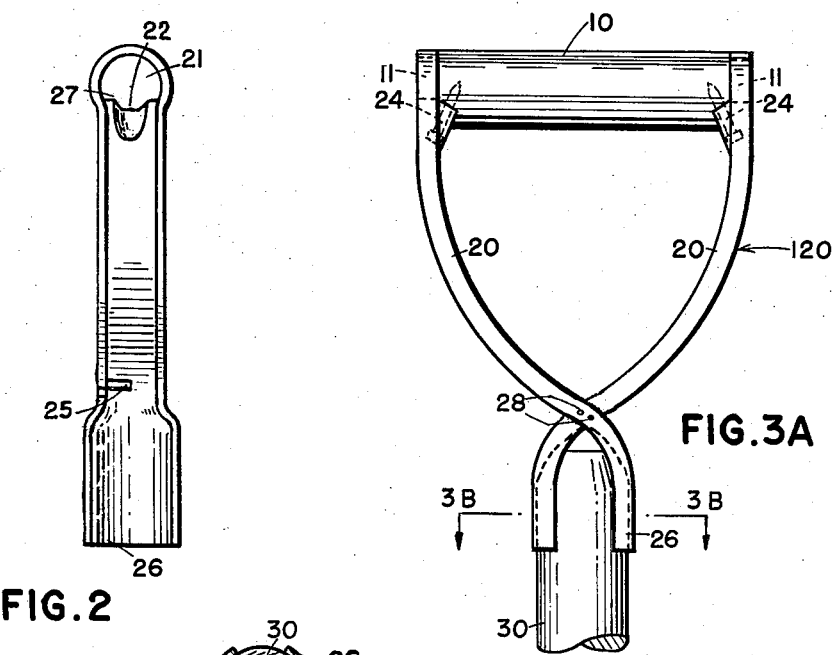
Karl August Düppengiesser
INVENTOR.
BY
AGENT.

Oct. 22, 1963  K. A. DÜPPENGIESSER  3,107,937
HAND GRIP FOR SOIL-WORKING IMPLEMENTS
Filed March 1, 1960  3 Sheets-Sheet 2
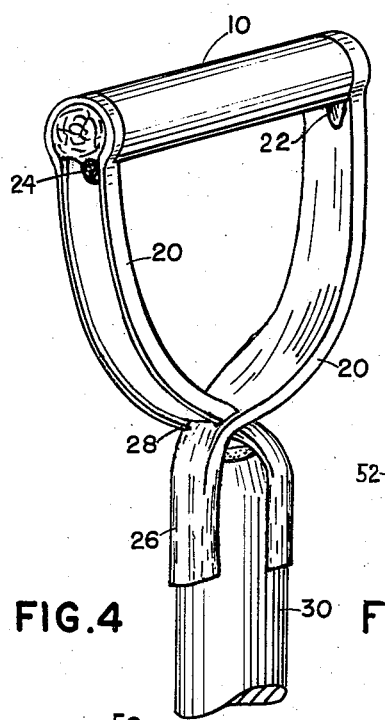
FIG.4
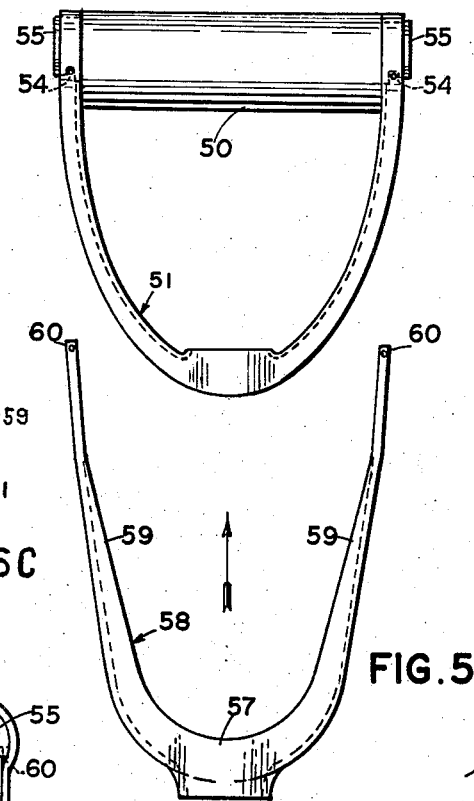
FIG.5
FIG.6C
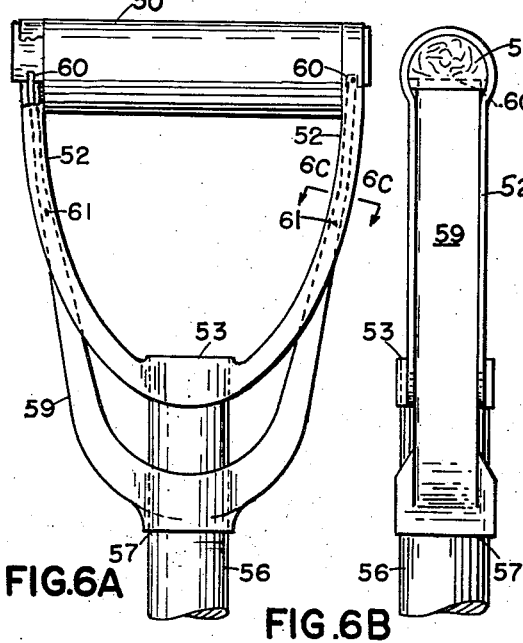
FIG.6A  FIG.6B
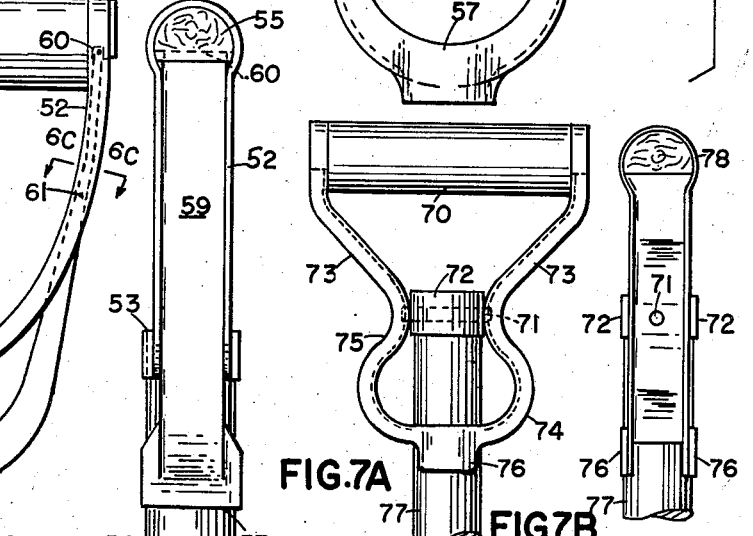
FIG.7A  FIG.7B
INVENTOR.
Karl August Düppengiesser
BY
AGENT.

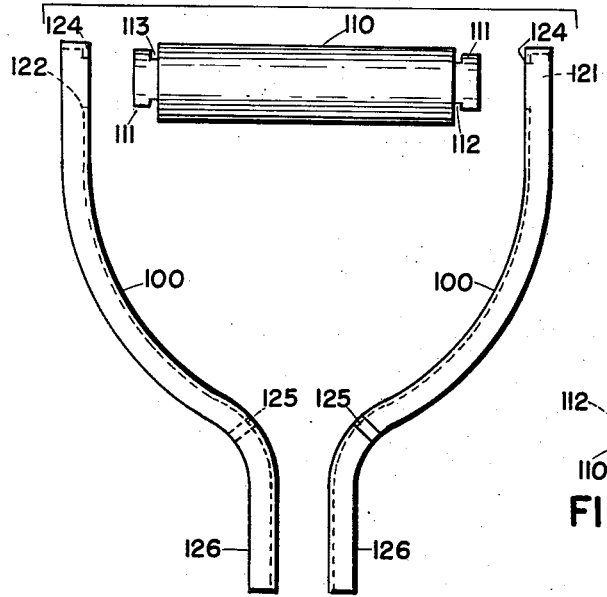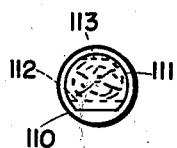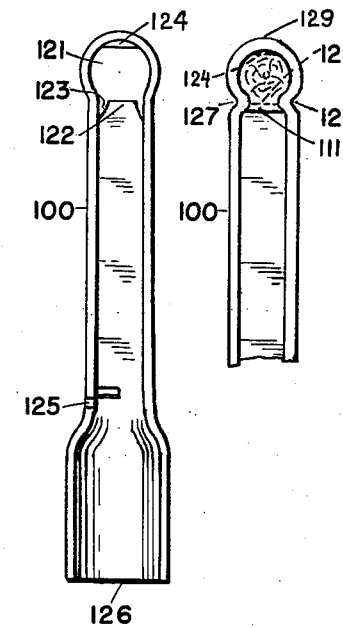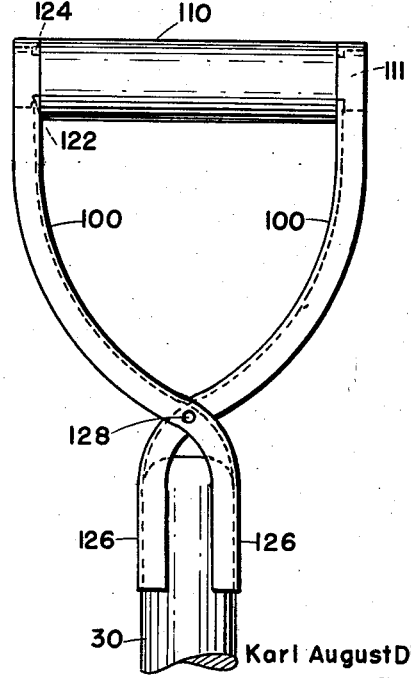

United States Patent Office 3,107,937
Patented Oct. 22, 1963

3,107,937
HAND GRIP FOR SOIL-WORKING
IMPLEMENTS
Karl August Düppengiesser, Unter der Charlottenburg 1,
Gera-Langenberg, Germany
Filed Mar. 1, 1960, Ser. No. 12,226
10 Claims. (Cl. 294—57)

My present invention relates to hand grips for tools provided with elongated handles, including particularly agricultural and soil-working implements such as spades, hay forks, shovels and the like.

It is known to provide the hand-grip portion of such implements with a socket, formed from one or more sheet-metal elements, adapted to receive the upper extremity of a handle shaft whose lower extremity is lodged in the working portion of the implement. Such hand grips either were insufficiently dependable in use or else required complicated and expensive operation in order to form a firm connection with the handle shaft.

It is, accordingly, the general object of my present invention to obviate the above-mentioned disadvantages by the provision of a hand grip for implements of the class described which can be inexpensively manufactured and secured to a handle shaft in a simple and reliable manner.

Another object of my invention is the provision of a hand grip adapted to be used in conjunction with heavy-duty implements and to withstand the severe forces acting thereupon.

A more specific object of my invention is the provision of improved means for securing the grasping portion of such hand grip to a holder therefor whereby that portion will not tend to loosen or become dislodged even upon extensive use.

In accordance with a feature of the invention, I provide a grip whose hand-grasping portion is constituted by a transverse bar, preferably of wood, having stepped-down end extensions of non-circular cross-section adapted to be received in corresponding openings provided near the free ends of the arms of a substantially U-shaped portion of a holder, the hand-grasping bar being thus restrained from rotation within the openings. The holder, according to another feature, consists of two preferably metallic parts which are initially movable relatively to each other to facilitate its engagement with the bar; thereafter, the parts are moved into a clamping position in which they are secured to each other by suitable fastening means, such as a welding connection, rivets or bolts, so that the arms of the U-shaped portion are urged against the body of the bar to hold it in place.

In accordance with a further feature of my invention, the holder comprises a trough-shaped strip of sheet metal, or a pair of such strips, whose concave side faces outwardly at least in the region of the U-shaped portion, this arrangement offering increased resistance of the holder against the outward deformation of its arms to release the bar.

The above and other objects, features and advantages of my present invention will become more readily apparent from the following description, reference being made to the accompanying drawing in which:

FIGURE 1A is an exploded view of a hand grip according to the invention;

FIG. 1B is a cross-sectional view taken along line 1B—1B of FIG. 1A;

FIG. 1C is an end-elevational view of a grip bar forming part of the assembly of FIGS. 1A and 1B;

FIG. 2 is a side-elevational view of one of the holder elements shown in FIG. 1A;

FIG. 3A is a front-elevational view of the hand grip, assembled;

FIG. 3B is a cross-sectional view taken on line 3B—3B of FIG. 3A;

FIG. 4 is a perspective view of the assembled hand grip;

FIG. 5 is a front-elevational view of a second embodiment of the invention, prior to assembly;

FIG. 6A is an elevational view, similar to FIG. 3, of the assembled hand grip of FIG. 5;

FIG. 6B is a side-elevational view of the hand grip of FIG. 6A;

FIG. 6C is a cross-sectional view taken on the line 6C—6C of FIG. 6B;

FIG. 7A is a front-elevational view of still another embodiment;

FIG. 7B is a side-elevational view of the embodiment of FIG. 7A;

FIG. 8A is a view, similar to FIG. 1A, of a modified hand grip according to the invention;

FIG. 8B is an end-elevational view of a grip bar forming part of the assembly of FIG. 8A;

FIG. 9A is a side-elevational view of one of the holder elements shown in FIG. 8A, prior to the assembly thereof;

FIG. 9B is a view, similar to FIG. 9A, of the holder element of FIG. 9A in the shape it assumes after the assembly of the hand grip; and FIG. 10 is a front-elevational view of the assembled hand grip of FIGS. 8A, 8B, 9A and 9B.

In FIGS. 1A to 4, I show a hand grip comprising a substantially cylindrical wooden bar 10 with reduced, non-circular end extensions 11, here shown to be of three-quarter-segmental cross-section (see FIG. 1C), a pair of holder arms 20 having openings 21 adapted to receive the extensions 11 of member 10, and a handle shaft 30 to which the assembly 10, 20 may be secured. Members 20, die-cut and drawn into channel shape from a suitable sheet-metal blank, together define a U-shaped holder portion. They are provided with slots 25, cut transversely through one flange and half the web thereof, whereby the two holder members may be interlocked by simply mating their slotted portions in order to form the completed holder 120 shown in FIGS. 3A and 4. Below slot 25 the cross-section of each arm 20 changes from angular to round so that, in the region beyond their point of intersection, these arms (whose concave sides are now facing each other) form transversely curved tongues 26 partially enclosing the upper portion of handle 30. The arms 20 are further provided, at their upper ends, with inwardly projecting lugs 22 having inclined bores 23 terminating in the vicinity of the straight boundaries 27 of the openings 21. The hollow lugs 22, each advantageously formed in the same operation as the rest of the member 20, are thus adapted to receive wood screws 24 or the like, dimensioned to pass through the bores 23 into the body of bar 10 at an undercut portion 12 thereof. Should a harder material be used for the bar 10, a threaded female insert may of course be imbedded therein to receive a machine screw in place of the wood screw 24.

In the assembly of the hand grip shown in FIGS. 1A to 4, bar extensions 11 are pushed into the openings 21 whereupon the members 20 are interlocked at slots 25 about handle 30, the screws 24 being then introduced into the bores 23 to engage the bar, thereby forming a rigid connection between the bar 10, the members 20 and the handle 30. Suitable fastening means such as rivets or bolts (not shown), similar to element 71 of FIGS. 7A and 7B, may be used to secure the tongues 26 firmly to the handle 30, this action also serving to urge the arms 20 against the body of bar 10 by reason of the scissor-like interlinking of these arms. The arms 20 may then be spot-welded to each other, e.g. as shown at 28, or otherwise joined to insure a secure and rigid connection therebetween.

The hand grip shown in FIGS. 5, 6A, 6B and 6C comprises a grasping bar 50 having end extensions 55 adapted to be received in appropriate openings provided in the arms 52 of an upper portion 51 of a U-shaped sheet-metal holder similar to the top of holder 120 of the preceding embodiment. Holder portion 51, whose arms 55 have a certain flexibility to facilitate their engagement with bar 50, co-operates with a generally similar, bifurcate lower holder portion 58 serving as a locking member for the upper portion 51. The arms 52 terminate in a collar 53 adapted to surround a handle shaft 56. The locking member 58, having a collar 57 likewise adapted to surround the handle shaft, is formed with prongs 59 having tips 60 adapted to enter a pair of slots 54 provided in bar extension 55 thus to lock the bar 50 against withdrawal from the holder 51. The channel-shaped arms 52 are outwardly concave whereas the prongs 59, respectively nested therein, are open toward the axis of the handle 56 as best seen in FIG. 6C. The members 52, 59 are advantageously joined together in a permanent manner, e.g. by spot-welding at 61; member 58, which may be more rigid than member 51, serves as a means for firmly urging the legs 52 of the latter against the bar 50. The collars 53 and 57 may be force-fitted to the handle 56 or otherwise secured thereto by means known per se.

In FIGS. 7A and 7B, I show a hand grip comprising a grasping bar 70 received in a pair of arms 73 of a lyre-shaped member 74 which co-operates with a metallic collar 72 to form a holder assembly. Arms 73 are bent toward each other at a point 75, being urged against collar 72 by a rivet or bolt 71 which has the dual function of fastening this collar to a handle 77 and firmly pressing the arms 73 against the bar 70 previously introduced into the openings 78 thereof. A pair of curved flaps 76 depend from member 74, as integral extensions of its channel-forming longitudinal flanges, to engage the handle 77 at a location below collar 72. Additional fastening means may, of course, be provided at the flaps 76 to help secure them to the holder member 74. It will be understood that, before the fastener is applied, the arms 73 are somewhat flexible about their vertex in the region of flaps 76 to facilitate insertion of bar 70 into openings 78.

In FIGS. 8A to 10 I show a hand grip similar to that described with reference to FIGS. 1A to 4, comprising a cylindrical grip bar 110 whose end extensions 111 of three-quarter-segmental cross-section are formed with a pair of upper slots 113 and a pair of lower slots 112 located respectively above and below the axis of the bar, a pair of holder arms 100, and a handle shaft 30 to which the hand-grip assembly may be secured. The upper extremity of handle shaft 30 is adapted to be received between the transversely curved tongues 126 of holder arms 100 when the latter are joined at slots 125 and spot-welded at 128 as described with reference to FIGS. 1A to 4. The end extensions 111 are adapted to be received in the openings 121 provided at the upper ends of the holder arms 100. The openings 121 are partly obstructed by downwardly projecting web portions 124, adapted to be received in the upper slots 113 of the end extensions 111, and with upwardly projecting tongue portions 122 inwardly cut away at 123 to render the tongue 122 sufficiently resilient to permit the entry of the end extensions 111 into the openings 121.

The hand grip is then assembled by interlocking the holder arms 100 at slots 125 about handle 30, as described above, and pushing the end extensions 111 into openings 121. The web portions 124 thus register with the upper slots 113 of the end portions while the tongues 122 snap into the lower slots 112 of the grip bar 110. The flange portions 127 in the vicinity of the openings 121 are then crimped or pinched against the end extensions 111 and the tongue 122 (FIG. 9B) to fill the spaces 123, this action also lowering the upper rim 129 of each holder 100 so that its web portion 124 will enter the slot 113 previously aligned therewith. Thus, the bar 110 is now firmly anchored to the holder arms 100 as shown in FIG. 10.

The invention as described is susceptible of many variations and modifications readily apparent to persons skilled in the art, and intended to be included within the spirit and scope thereof, except as further limited by the appended claims.

I claim:
1. A hand grip for a soil-working implement provided with an elongated handle, comprising a generally U-shaped member attachable to said handle, said member being provided with openings near the free ends of the arms of the U, a bar provided with reduced end portions respectively received in said openings, each end portion being formed with at least one transverse notch spaced from its end face, and at least one formation on each of said arms projecting into the opening thereof and matingly fitting into a respective one of said notches.

2. A hand grip for a soil-working implement provided with an elongated handle, comprising a generally U-shaped sheet-metal member attachable to said handle, said member being longitudinally channeled with an outwardly facing concavity and being provided with openings near the free ends of the arms of the U, a bar provided with reduced end portions respectively received in said openings, each end portion being formed with at least one transverse notch spaced from its end face, and at least one resilient formation on each of said arms projecting into the opening thereof and resiliently fitting into a respective one of said notches.

3. A hand grip for a soil-working implement provided with an elongated handle, comprising a generally U-shaped member attachable to said handle, said member being provided with noncircular openings near the free ends of the U, a bar provided with reduced correspondingly noncircular end portions respectively received in said openings, each end portion having a flat side formed with at least one transverse notch spaced from the end face of said end portion, and at least one formation on each of said arms projecting into the opening thereof and matingly fitting into a respective one of said notches.

4. A hand grip for a soil-working implement provided with an elongated handle, comprising a generally U-shaped sheet-metal member attachable to said handle, said member being longitudinally channeled with an outwardly facing concavity and being provided with noncircular openings near the free ends of the arms of the U, a bar provided with reduced correspondingly noncircular end portions respectively received in said openings, each end portion having a flat side formed with a first and a second transverse notch positioned opposite each other at a location spaced from the end face of said end portion, and two tongue-shaped formations integral with said member on each of said arms projecting into the opening thereof from opposite sides and matingly fitting into said notches, one of said formations being resilient.

5. A hand grip according to claim 4 wherein said resilient formation engages said first notch.

6. A hand grip for a soil-working implement provided with an elongated handle, comprising a pair of intersecting scissor arms in the form of substantially symmetrical, intersecting sheet-metal channel members of continuous cross-section with upper extremities forming a generally U-shaped portion above their point of intersection and lower extremities forming a handle-receiving portion below their point of intersection, and a bar spanning said U-shaped portion in rigid engagement with the free ends of the upper extremities of said arms, said channel members having each a pair of flanges of which one is continuous whereas the other is formed with a lateral incision extending halfway across the width of the arm, said incisions interlocking at said point of intersection, said upper extremities being substantially angular in cross-section and having their concave sides facing outwardly, said lower extremities being arcuate in cross-section and turning their concave sides toward each other for engagement with said handle.

7. A hand grip according to claim 6 wherein said upper extremities are provided with aligned openings and said bar has reduced portions respectively received in said openings.

8. A hand grip according to claim 6 wherein said arms are provided with a welding connection at said point of intersection.

9. A hand grip according to claim 7 wherein said arms are provided with inwardly extending lugs adjacent said openings having bores terminating at said bar, further comprising screw means passing through said bores from the exterior of said arms into engagement with said bar.

10. A hand grip acccording to claim 7 wherein said arms are pinched adjacent said free ends about said end portions for firmer contact with said bar.

References Cited in the file of this patent
UNITED STATES PATENTS

| | | |
|---|---|---|
| 237,891 | Musselman | Feb. 15, 1881 |
| 765,851 | Nettleton | July 26, 1904 |
| 1,168,267 | Adams | Jan. 18, 1916 |
| 1,644,799 | Toplitz | Oct. 11, 1927 |
| 1,687,190 | Wulff | Oct. 8, 1928 |
| 1,751,414 | Marienthal | Mar. 18, 1930 |